(12) United States Patent
Mitsuka et al.

(10) Patent No.: US 12,314,324 B2
(45) Date of Patent: May 27, 2025

(54) DATA ANALYSIS APPARATUS, DATA ANALYSIS SYSTEM, AND NON-TRANSITORY COMPUTER-READABLE STORAGE MEDIUM

(71) Applicant: Mitsubishi Electric Corporation, Tokyo (JP)

(72) Inventors: Yoshihiro Mitsuka, Tokyo (JP); Yoshikuni Miyata, Tokyo (JP); Motofumi Awa, Tokyo (JP); Ryosuke Sakai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/216,245

(22) Filed: Jun. 29, 2023

(65) Prior Publication Data

US 2023/0342402 A1    Oct. 26, 2023

Related U.S. Application Data

(63) Continuation of application No. PCT/JP2021/042708, filed on Nov. 22, 2021.

(30) Foreign Application Priority Data

Feb. 22, 2021   (JP) .................................. 2021-026011

(51) Int. Cl.
*G06F 17/30*     (2006.01)
*G06F 16/903*    (2019.01)
*G06F 16/906*    (2019.01)

(52) U.S. Cl.
CPC ...... *G06F 16/906* (2019.01); *G06F 16/90344* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 6,230,064 B1 *  5/2001  Nakase .................. G06Q 10/06
                                                    715/764
11,768,915 B1 *  9/2023  Shama ..................... G06F 18/22
                                                    707/737

(Continued)

OTHER PUBLICATIONS

International Search Report for PCT/JP2021/042708 (PCT/ISA/210) mailed on Feb. 8, 2022.

(Continued)

*Primary Examiner* — Hung D Le
(74) *Attorney, Agent, or Firm* — Birch, Stewart, Kolasch & Birch, LLP

(57) ABSTRACT

A data analysis apparatus performs to acquire series data having character strings related to an information system to be analyzed as elements and series data having numerical values indicating a state of a device constituting the information system as elements, each of the series data having an index that enables comparison of element order relations within series and between series, classify the elements of each piece of the series data into classification classes, and output series data having classification values indicating classification classes as elements, integrate series data having classification values of the character strings as elements and series data having classification values of the numerical values as elements into one piece of series data, and detect an occurrence of a frequent pattern which is a combination of frequently occurring elements, using the one piece of series data obtained through integration.

9 Claims, 10 Drawing Sheets

(56) References Cited

U.S. PATENT DOCUMENTS

| | | | |
|---|---|---|---|
| 2004/0054294 A1* | 3/2004 | Ramseth | G16H 40/63 |
| | | | 600/509 |
| 2007/0136379 A1* | 6/2007 | Massie | G06F 16/24568 |
| 2008/0027683 A1* | 1/2008 | Middleton | G05B 23/0272 |
| | | | 702/187 |
| 2014/0032506 A1* | 1/2014 | Hoey | G06F 16/215 |
| | | | 707/691 |
| 2014/0108314 A1* | 4/2014 | Chen | G06F 11/3072 |
| | | | 706/20 |
| 2014/0156806 A1* | 6/2014 | Karpistsenko | G06Q 10/06 |
| | | | 709/219 |
| 2014/0180160 A1* | 6/2014 | Brown | A61B 5/6868 |
| | | | 600/544 |
| 2016/0321330 A1* | 11/2016 | Ziegler | G06F 3/04817 |
| 2018/0046926 A1* | 2/2018 | Achin | G06F 9/5011 |
| 2018/0136994 A1* | 5/2018 | Toledano | G06F 11/327 |
| 2018/0309807 A1* | 10/2018 | Smith | H04L 67/02 |
| 2018/0322400 A1* | 11/2018 | Shahand | G06F 11/30 |
| 2019/0228291 A1* | 7/2019 | Kurasawa | G06N 5/02 |
| 2019/0324070 A1* | 10/2019 | Saneyoshi | H02J 13/00006 |
| 2019/0355070 A1* | 11/2019 | Ikemoto | G06Q 10/04 |
| 2020/0337648 A1* | 10/2020 | Saripalli | G16H 15/00 |
| 2020/0387492 A1* | 12/2020 | Duffield | G06F 16/2264 |
| 2021/0073320 A1* | 3/2021 | Ocondi | G06F 7/544 |
| 2021/0256358 A1* | 8/2021 | Deng | G06N 3/045 |
| 2021/0382900 A1* | 12/2021 | Mantzouratos | G06F 16/2477 |
| 2022/0147669 A1* | 5/2022 | Quanz | G06Q 10/04 |
| 2022/0198263 A1* | 6/2022 | Guo | G06Q 50/01 |
| 2022/0263852 A1* | 8/2022 | Crabtree | G06N 5/045 |
| 2022/0335523 A1* | 10/2022 | Weng | G06Q 40/04 |

OTHER PUBLICATIONS

Lin et al., "Fast Dimensional Analysis for Root Cause Investigation in a Large-Scale Service Environment", In Proceedings of the ACM on Measurement and Analysis of Computing Systems (POMACS), Jun. 2020, vol. 4, No. 2, Article 31, total 24 pages.
German Office Action for German Application No. 11 2021 006 561.0, dated Apr. 26, 2024, with English translation.

* cited by examiner

FIG. 2A
Oct 10 0:00:00 received xxx
Oct 10 0:00:01 error
Oct 10 0:00:03 sent abc
Oct 10 0:59:57 connected
FIG. 2B
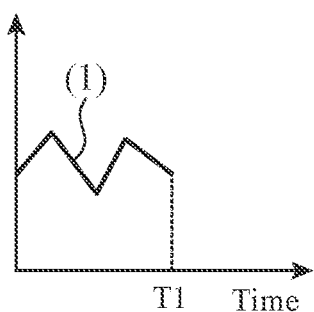
FIG. 2C
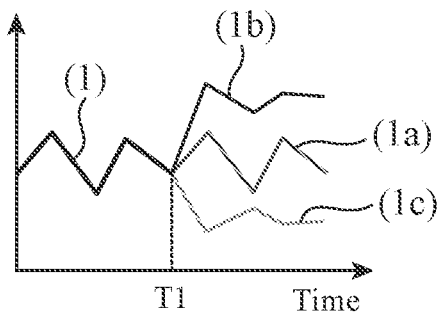
FIG. 3
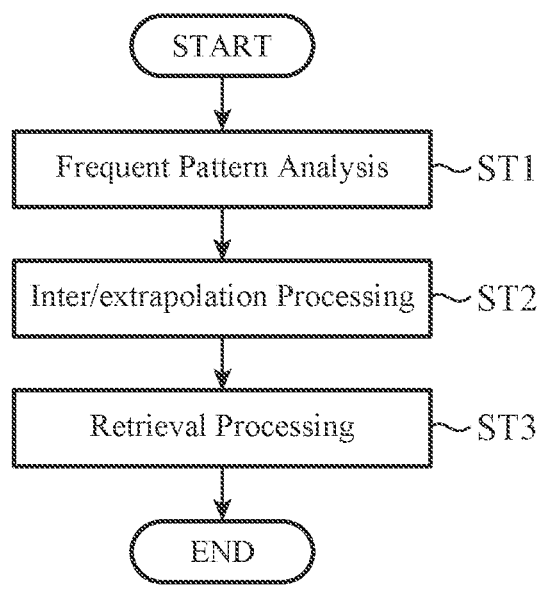

FIG. 5
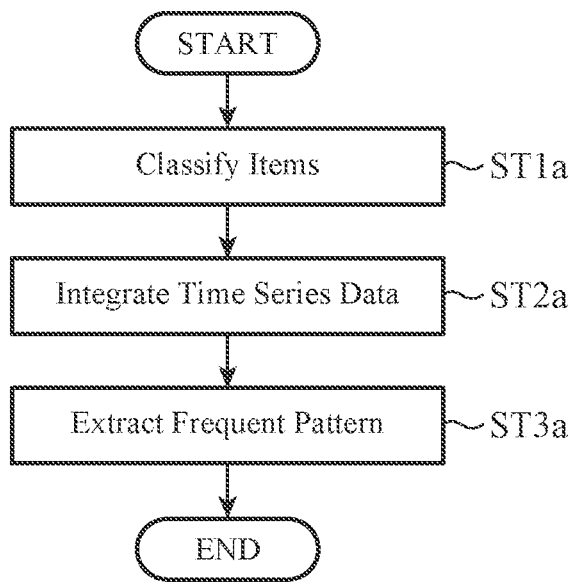
FIG. 6A
Oct 10 0:00:00 received xxx
Oct 10 0:00:01 error
Oct 10 0:00:03 sent abc
Oct 10 0:59:57 connected to z
Oct 10 1:10:01 received yyy
Oct 10 1:00:18 sent abd
Oct 10 1:02:02 resent qqq
FIG. 6B
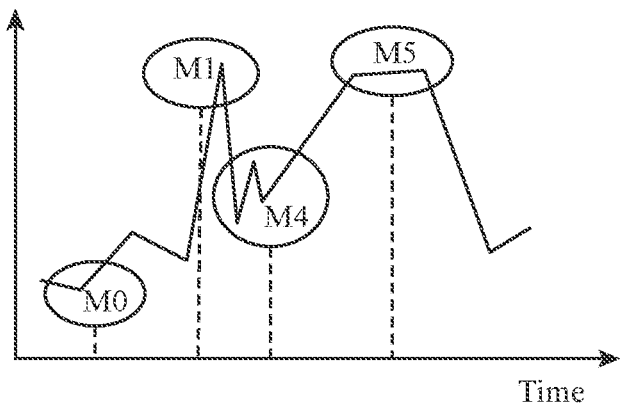
FIG. 6C
Oct 10 0:00:00 L3
Oct 10 0:00:01 L2
Oct 10 0:00:03 L5
Oct 10 0:59:57 L1
Oct 10 1:10:01 L3
Oct 10 1:00:18 L5
Oct 10 1:02:02 L4
FIG. 6D
Oct 10 0:00:00 M1
Oct 10 0:00:01 M0
Oct 10 0:00:02 M3
Oct 10 0:59:57 M3
Oct 10 0:59:59 M4
Oct 10 1:10:01 M5
Oct 10 1:10:13 M2
Oct 10 1:00:18 M6

Oct 10 0:00:00 L3 M1
Oct 10 0:00:01 L2 M0
Oct 10 0:00:02 M3
Oct 10 0:00:03 L5
Oct 10 0:59:57 L1 M3
Oct 10 0:59:59 M4
Oct 10 1:10:01 L3 M5
Oct 10 1:10:13 M2
Oct 10 1:00:18 L5 M6
Oct 10 1:02:02 L4

Pattern 1: (L3 M0 L5)
Pattern 2: (L3 L5)
Pattern 3: (L1 M4 M5 M6)

Oct 10 0:00:00 L3 M1
Oct 10 0:00:01 L2 M0
Oct 10 0:00:02 M3
Oct 10 0:00:03 L5
Oct 10 0:59:57 L1 M3
Oct 10 0:59:59 M4
Oct 10 1:10:01 L3 M5
Oct 10 1:10:13 M2
Oct 10 1:00:18 L5 M6
Oct 10 1:02:02 L4

Oct 10 0:00 Pattern 1
Oct 10 0:59 Pattern 3
Oct 10 1:10 Pattern 2

FIG. 12A
Oct 10 0:00:00 received xxx
Oct 10 0:00:01 error
Oct 10 0:00:03 sent abc
Oct 10 0:59:57 connected
FIG. 12B
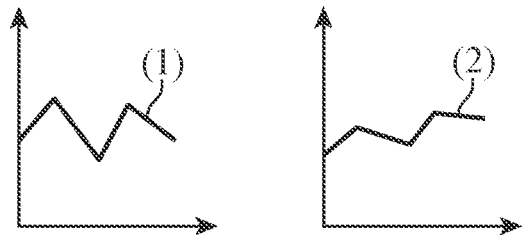
FIG. 12C
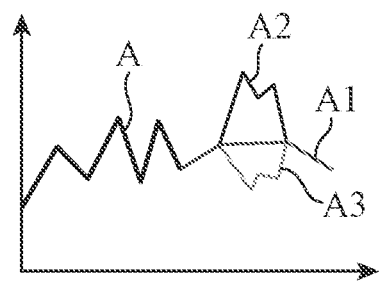
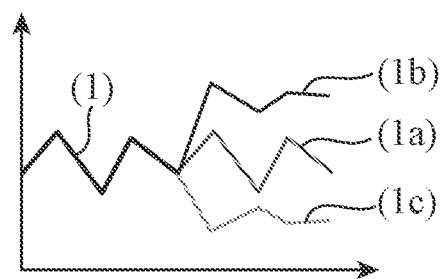
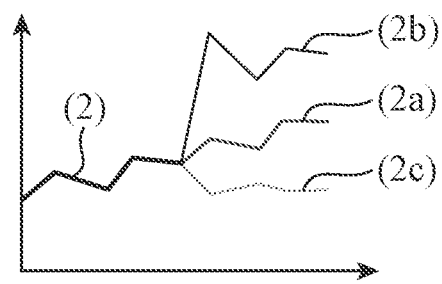

FIG. 15A
Pattern 1: (L3 M0 L5) Memory Exchange
Pattern 2: (L3 L5)
Pattern 3: (L1 M4 M5 M6) Wait and See
FIG. 15B
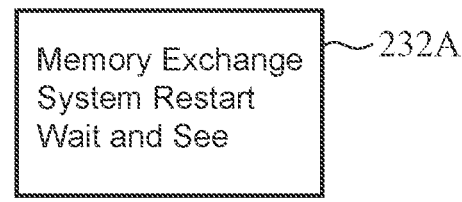
FIG. 16A
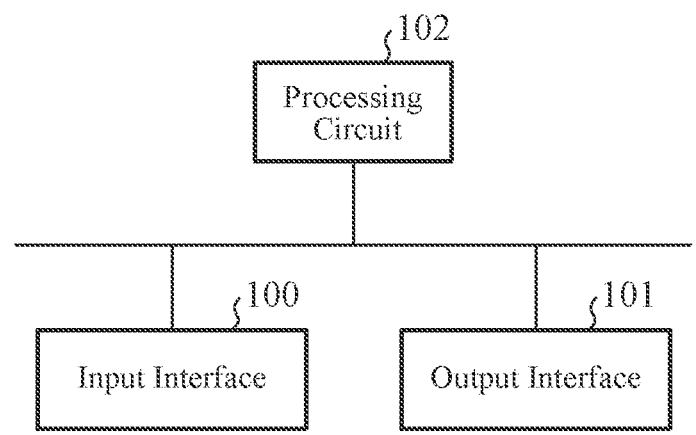
FIG. 16B
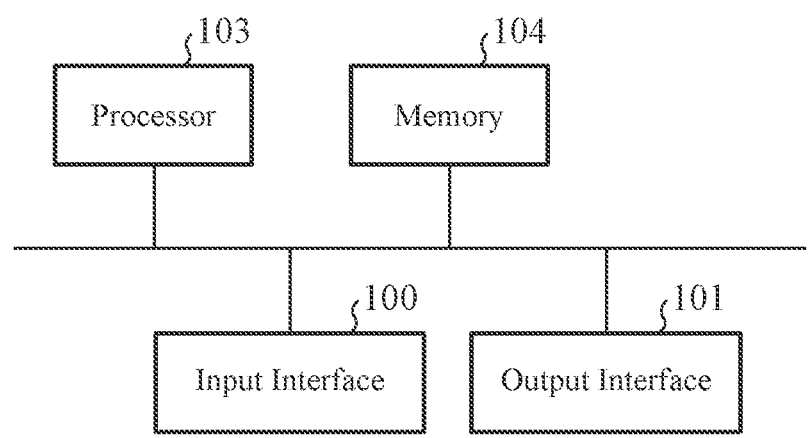

DATA ANALYSIS APPARATUS, DATA ANALYSIS SYSTEM, AND NON-TRANSITORY COMPUTER-READABLE STORAGE MEDIUM

CROSS REFERENCE TO RELATED APPLICATIONS

This application is a Continuation of PCT International Application No. PCT/JP2021/042708, filed on Nov. 22, 2021, which claims priority under 35 U.S.C. 119(a) to Patent Application No. 2021-026011, filed in Japan on Feb. 22, 2021, all of which are hereby expressly incorporated by reference into the present application.

TECHNICAL FIELD

The present disclosure relates to a data analysis apparatus, a data analysis system, and a non-transitory computer-readable storage medium.

BACKGROUND ART

A technique for analyzing a phenomenon occurring in an information system by applying frequent pattern mining to log data of a character string output from a device constituting the information system has been proposed. For example, Non-Patent Literature 1 describes a conventional technique of analyzing a phenomenon occurring in an information system to be analyzed by performing frequent pattern mining on a result of classifying data of each row in log data of a character string.

CITATION LIST

Non-Patent Literature

Non-Patent Literature 1: F. Lin, K. Muzumdar, N. P. Laptev, M. -V. Curelea, S. Lee, and S. Sankar, "Fast dimensional analysis for root cause investigation in a large-scale service environment", in Proceedings of the ACM on Measurement and Analysis of Computing Systems (POMACS), 2020.

SUMMARY OF INVENTION

Technical Problem

However, the conventional technique described in Non-Patent Literature 1 has a problem that analysis accuracy of a phenomenon occurring in an information system to be analyzed is decreased in a case where log data on which frequent pattern mining is to be performed has insufficient information for analysis.

The present disclosure solves the above problems, and an object of the present disclosure is to obtain a data analysis apparatus, a data analysis system, and a non-transitory computer-readable storage medium that can supplement data necessary for analysis of a phenomenon that has occurred in an information system.

Solution to Problem

A data analysis apparatus according to the present disclosure includes processing circuitry to acquire series data having a character string related to an information system to be analyzed as an element and series data having a numerical value indicating a state of a device constituting the information system as an element, each of the series data having the character string and the series data having the numerical value having an index that enables comparison of element order relations within series and between series, classify the element of each piece of the series data having the character string and the series data having the numerical value into a classification class, and output series data having a classification value indicating the classification class as an element, to perform integration of the series data having a classification value of the character string as an element and the series data having a classification value of the numerical value as an element into one piece of series data, and to perform detection of an occurrence of a frequent pattern which is a combination of frequently occurring elements, using the one piece of series data obtained by the integration.

Advantageous Effects of Invention

According to the present disclosure, the series data having a character string related to the information system to be analyzed as an element and the series data having a numerical value indicating the state of the device constituting the information system as an element are integrated into one piece of series data, so that frequent pattern mining can be performed on the series data in which one of the series data pieces is supplemented with the other series data. Thus, the data analysis apparatus according to the present disclosure can supplement data necessary for analysis of a phenomenon that has occurred in the information system to be analyzed.

BRIEF DESCRIPTION OF DRAWINGS

FIG. 2A is a diagram illustrating an example of time series data having character strings as elements, FIG. 2B is a graph illustrating an example of time series data having numerical values as elements, and FIG. 2C is a graph illustrating an example of time series data in which an element at a time stamp not included in the time series data is interpolated or extrapolated.

FIG. 3 is a flowchart illustrating an operation of a data analysis apparatus according to the first embodiment.

FIG. 5 is a flowchart illustrating an operation of the frequent pattern analyzing unit during learning.

FIG. 6A is a diagram illustrating an example of time series data having character strings as elements, FIG. 6B is a graph illustrating an example of time series data having numerical values as elements, FIG. 6C is an example of time series data having classification values of the character strings as elements, and FIG. 6D is an example of time series data having classification values of the numerical values as elements.

FIG. 12A is a diagram illustrating an example of time series data having character strings as elements, FIG. 12B is a graph illustrating an example of time series data having numerical values as elements, and FIG. 12C is a graph illustrating an example of time series data that is interpolated or extrapolated.

FIG. 15A is a diagram illustrating frequent pattern information stored in a storage apparatus, and FIG. 15B is a diagram illustrating an example of past work information.

FIG. 16A is a block diagram illustrating a hardware configuration for implementing functions of the data analysis apparatus according to the first embodiment, and FIG. 16B is a block diagram illustrating a hardware configuration for executing software that implements the functions of the data analysis apparatus according to the first embodiment.

DESCRIPTION OF EMBODIMENTS

First Embodiment

Figure 1:
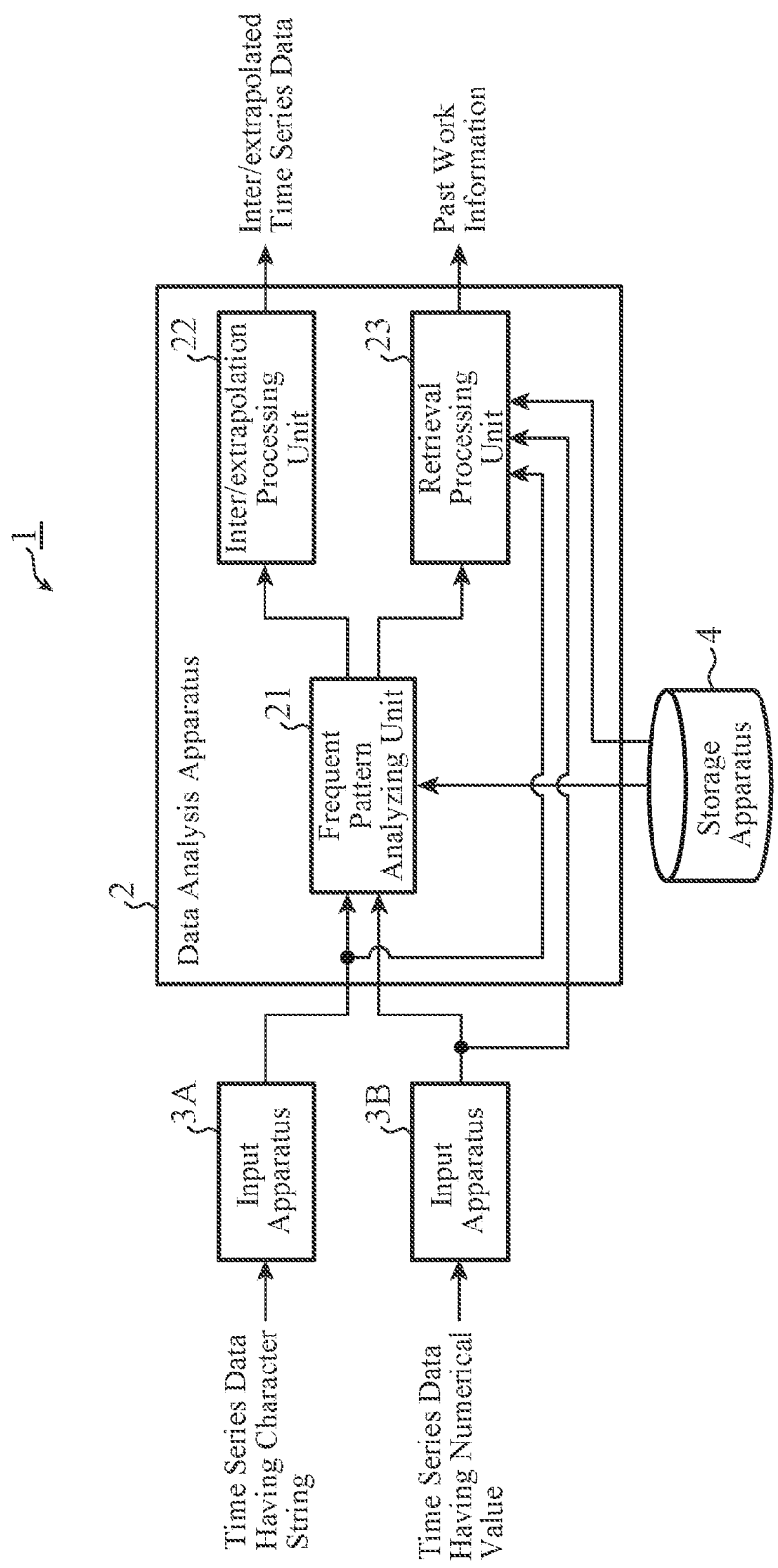
FIG. 1 is a block diagram illustrating the configuration of a data analysis system according to a first embodiment.

FIG. 1 is a block diagram illustrating the configuration of a data analysis system 1 according to a first embodiment. In FIG. 1, the data analysis system 1 analyzes a phenomenon that has occurred in an information system to be analyzed. The information system handles various types of information, and includes, for example, a device that performs an operation related to exchange of information. Examples of the information system include a computer system that implements a database, a data warehouse, a data integration service, a distributed application, or a web service.

The data analysis system 1 includes a data analysis apparatus 2, an input apparatus 3A, an input apparatus 3B, and a storage apparatus 4. The data analysis apparatus 2 acquires time series data related to the information system to be analyzed, and performs data analysis using the acquired time series data.

The input apparatus 3A receives an input of time series data having character strings related to the information system to be analyzed as elements, and outputs the received time series data having character strings to the data analysis apparatus 2. The input apparatus 3B receives an input of time series data having numerical values indicating a state of the device constituting the information system as elements, and outputs the received time series data having numerical values to the data analysis apparatus 2.

In addition, the time series data having character strings as elements and the time series data having numerical values as elements which are acquired from the information system to be analyzed each have time stamps which are indices enabling comparison of order relations of the elements within series and between series.

The storage apparatus 4 stores definition information indicating a frequent pattern. The frequent pattern indicated by the definition information may be a frequent pattern extracted by the data analysis apparatus 2 from time series data acquired from the information system to be analyzed, or may be data in a similar format set or corrected by a user. Furthermore, the storage apparatus 4 stores past work information and a frequent pattern for a phenomenon occurring in the information system in association with each other.

FIG. 2A is a diagram illustrating an example of time series data having character strings as elements. The time series data having character strings acquired by a frequent pattern analyzing unit 21 includes time stamps which enable comparison of order relations of character strings within time series or between time series data pieces. For example, in the time series data illustrated in FIG. 2A, the time stamp "Oct 10 0:00:00" and the character string "received xxx" are associated with each other. The time stamps enable comparison of order relations of items in the time series data illustrated in FIG. 2A and also comparison of order relations of elements between time series data pieces.

FIG. 2B is a graph illustrating an example of time series data having numerical values as elements. The time series data (1) having numerical values acquired by the frequent pattern analyzing unit 21 can be represented by, for example, a graph illustrating a relationship between the numerical value representing the state of the device constituting the information system to be analyzed and time as illustrated in FIG. 2B. The numerical value representing the state of the device is an element of the time series data, and each time on the time axis is a time stamp. In FIG. 2B, the time series data (1) is time series data up to time T1.

FIG. 2C is a graph illustrating an example of time series data in which an element at a time stamp not included in the time series data is interpolated or extrapolated. In the time series data (1) illustrated in FIG. 2C, a representative value of estimated values of elements at time stamps not included in the time series data (1) illustrated in FIG. 2B, that is, time stamps after the time T1, is interpolated or extrapolated by an inter/extrapolation processing unit 22. The representative value of the estimated values of the elements interpolated or extrapolated in the time series data (1) is, for example, an average value (1a), a maximum value (1b), and a minimum value (1c) for each time stamp.

The data analysis apparatus 2 includes the frequent pattern analyzing unit 21, the inter/extrapolation processing unit 22, and a retrieval processing unit 23. FIG. 3 is a flowchart illustrating an operation of the data analysis apparatus 2. The frequent pattern analyzing unit 21 acquires series data having character strings related to the information system to be analyzed as elements and series data having numerical values indicating the state of the device constituting the information system as elements, and performs frequent pattern analysis using the acquired time series data (step ST1).

For example, the frequent pattern analyzing unit 21 integrates the time series data having character strings received by the input apparatus 3A and the time series data having numerical values received by the input apparatus 3B into one piece of time series data, and rearranges the elements in the integrated time series data on the basis of the order relation indicated by time stamps. Then, the frequent pattern analyzing unit 21 detects an occurrence of a frequent pattern which is a combination of the elements that frequently occur, using the time series data obtained by rearranging the elements.

The inter/extrapolation processing unit 22 receives time series data having the frequent pattern detected by the frequent pattern analyzing unit 21 as an element, interpolates or extrapolates an element at a time stamp not included in the input time series data, and outputs the interpolated or extrapolated time series data (step ST2). For example, the inter/extrapolation processing unit 22 calculates an estimated value of an occurrence rate of the frequent pattern and a statistic of the occurrence rate of the frequent pattern using the time series data having the frequent pattern detected by the frequent pattern analyzing unit 21. Then, the inter/extrapolation processing unit 22 interpolates or extrapolates an element at the time stamp not included in the time series data, using the estimated value of the occurrence rate of the frequent pattern and the statistic of the occurrence rate of the frequent pattern.

The retrieval processing unit 23 retrieves past work information for the phenomenon corresponding to the frequent pattern detected by the frequent pattern analyzing unit 21 and outputs the retrieved work information (step ST3). For example, the retrieval processing unit 23 selects time series data according to the degree of importance from at least one of the time series data having the frequent pattern detected by the frequent pattern analyzing unit 21 as an element, and the time series data having character strings as elements and the time series data having numerical values as elements which have been acquired from the information system to be analyzed. Then, the retrieval processing unit 23 retrieves the work information corresponding to the selected time series data among work information pieces stored in the storage apparatus 4, and outputs the retrieved work information.

Figure 4:
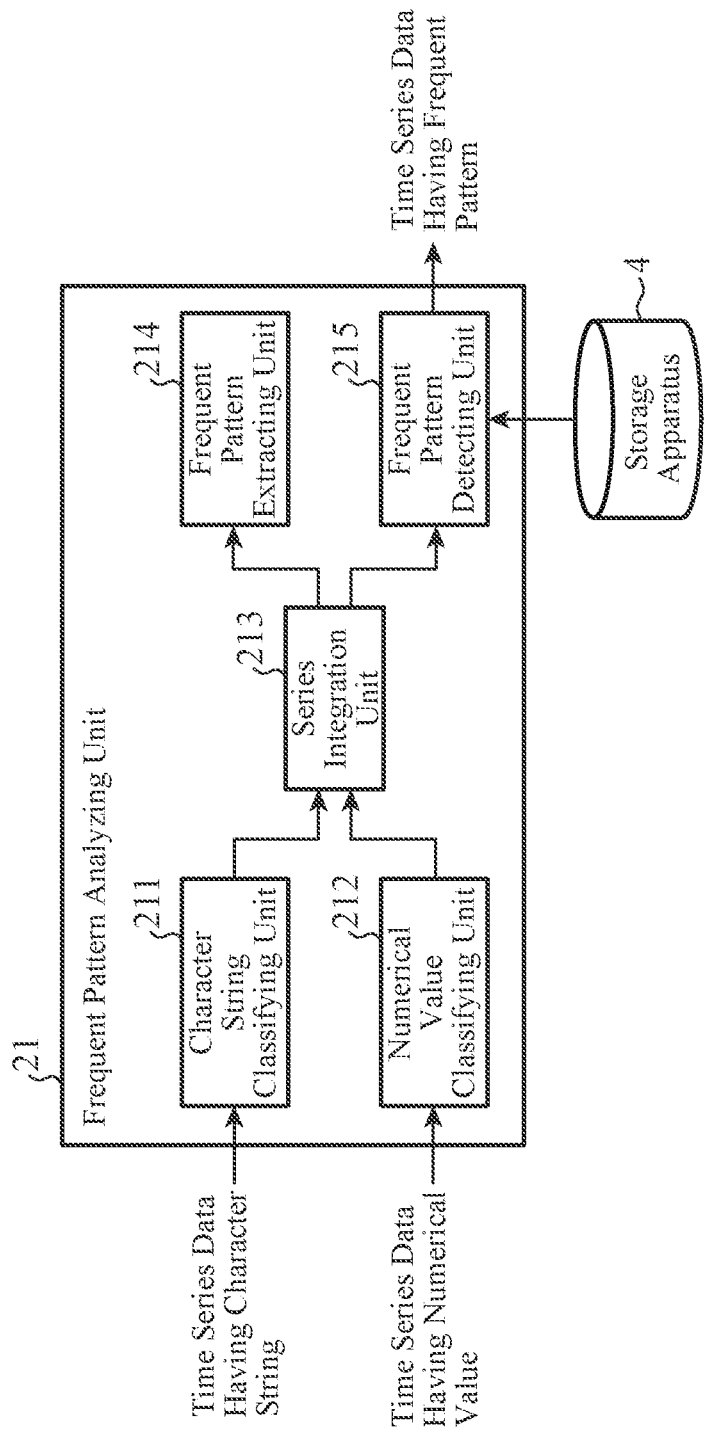
FIG. 4 is a block diagram illustrating a configuration of a frequent pattern analyzing unit.

FIG. 4 is a block diagram illustrating the configuration of the frequent pattern analyzing unit 21. In FIG. 4, the frequent pattern analyzing unit 21 includes a character string classifying unit 211, a numerical value classifying unit 212, a series integration unit 213, a frequent pattern extracting unit 214, and a frequent pattern detecting unit 215. In a learning phase in which the data analysis apparatus 2 learns the frequent pattern corresponding to the phenomenon occurring in the information system to be analyzed, only the frequent pattern analyzing unit 21 operates. The frequent pattern analyzing unit 21 extracts the frequent pattern to be analyzed using the time series data having character strings and the time series data having numerical values acquired from the information system to be analyzed as learning data.

The data analysis apparatus 2 integrates the series data having character strings related to the information system to be analyzed as elements and the series data having numerical values indicating the state of the device constituting the information system as elements into one piece of series data, thereby being capable of performing frequent pattern mining on the series data in which one of the series data pieces is supplemented with the other series data. For example, the data analysis apparatus 2 limited to the application that does not need information generated by the inter/extrapolation processing unit 22 and the retrieval processing unit 23 only needs to include the components of the frequent pattern analyzing unit 21 illustrated in FIG. 4. That is, the frequent pattern analyzing unit 21 illustrated in FIG. 4 functions as the data analysis apparatus 2.

The character string classifying unit 211 is a classification unit that acquires time series data having character strings related to the information system to be analyzed as elements, classifies the character strings of the acquired time series data at each time stamp into classification classes, and outputs time series data having classification values indicating the classification classes as elements.

For example, the character string classifying unit 211 classifies, among character strings at the respective time stamps of the time series data, a character string matching any of a plurality of preset templates of character strings, and when there is no matching template, the character string classifying unit 211 determines that there is no element at the time stamp. Further, the character string classifying unit 211 classifies a character string in each row of log data acquired from the information system to be analyzed.

The numerical value classifying unit 212 is a classification unit that acquires time series data having numerical values indicating the state of the device constituting the information system to be analyzed as elements, classifies the element of the acquired time series data at each time stamp into a classification class, and outputs time series data having classification values indicating the classification classes as elements. The numerical value classifying unit 212 classifies a set of numerical values related to the time stamp of the acquired time series data, for example, a list of numerical values in the temporal neighborhood of the time stamp, into a classification class, and outputs time series data having classification values indicating the classification classes as elements.

The temporal neighborhood of the time stamp refers to a temporal range including the time stamp in the time series data. For example, the temporal neighborhood of the time stamp is a temporal range such as three seconds before and after the time of the time stamp. For example, the numerical value classifying unit 212 classifies a numerical value belonging to any of a plurality of numerical value sections set in advance from among the numerical values or representative values of a list of numerical values at time stamps of the acquired time series data, and when there is no matching section, the numerical value classifying unit 212 determines that there is no element at the time stamp. In addition, the numerical value classifying unit 212 classifies numerical values having a graphical form similar to that of a plurality of preset numerical values among graphical forms indicated by the numerical values or the list of numerical values at the time stamps of the acquired time series data.

The series integration unit 213 integrates the series data having classification values of character strings as elements and the series data having classification values of numerical values as elements into one piece of series data.

For example, the series integration unit 213 integrates the series data having classification values of the character strings as elements and the series data having classification values of the numerical values as elements in the time direction indicated by the time stamps, and generates time series data in which the elements are rearranged according to the order relation indicated by the time stamps.

As a result, information which pertains to the phenomenon occurring in the information system to be analyzed and which is not included in the log data in the character string format is supplemented by the data derived from the time series data having numerical values indicating the state of the device.

In the following description, an element of time series data or a classification value of a list of elements will be described as an item.

The frequent pattern extracting unit 214 generates transaction data obtained by assigning an identification value of a time stamp to a set of items included in the time series data output from the series integration unit 213, and extracts a frequent pattern by performing frequent pattern mining on the transaction data. For example, the frequent pattern extracting unit 214 extracts a combination of items determined to frequently occur in the time series data as the frequent pattern on the basis of the occurrence frequency of a partial set in the set of items.

The frequent pattern is a combination of items in an arbitrary order, and may be expressed as separated parts including an antecedent and a consequence as a correlation rule. In addition, each of the antecedent and the consequence can be further treated as a frequent pattern. For example, the frequent pattern may be expressed as a combination of an antecedent which is a set of specific items included in the combination of items in the correlation rule of the frequent pattern mining, a consequence which is a set of remaining items in the correlation rule, and a numerical value indicating a confidence that represents probability of an occurrence of the consequence when the antecedent is established. For example, in a case where the "combination of items in an arbitrary order" as a frequent pattern in transaction data {a, b, c, d, e, f} is {a, b, c, d}, and the antecedent therein is {a, c}, {b, d} which is a "set of remaining items" is the consequence.

Note that the frequent pattern is a set of items that frequently occur due to occurrence of some phenomenon in the information system to be analyzed, and can be utilized as data indicating a factor for a set of a part of the items.

Note that the set of items is a combination of items in an arbitrary order without duplication. For example, a set of items can be generated from the time series data by removing duplication of items from a list of items of elements included in the temporal neighborhood of the individual time stamp in the time series data. In addition, the frequent pattern extracting unit 214 can extract the frequent pattern by generating transaction data using the time series data and performing association analysis on the generated transaction data.

The transaction data is data in which a set of items is assigned with an identification value and distinguished for each occurrence event of the set of items. For example, in accounting processing of sales of articles, a set of items is a combination of purchased items, and transaction data to which frequent pattern mining is performed is purchase history data managed by a processing number of the accounting processing assigned to the set of items.

The frequent pattern detecting unit 215 detects the occurrence of a frequent pattern which is a combination of the frequently occurring elements in the time series data output from the series integration unit 213. For example, the frequent pattern detecting unit 215 generates transaction data using the time series data, and compares a set of items included in the generated transaction data with definition information of the frequent pattern stored in the storage apparatus 4. When there is a set of items matching the definition information of the frequent pattern stored in the storage apparatus 4, the frequent pattern detecting unit 215 determines that the frequent pattern has occurred in the time series data acquired from the information system to be analyzed.

The frequent pattern detecting unit 215 generates time series data having identification values of the frequent patterns generated in the temporal neighborhood of each time stamp, and outputs the generated time series data to the inter/extrapolation processing unit 22.

The frequent pattern detecting unit 215 generates time series data having identification values of the frequent patterns generated in the temporal neighborhood of each time stamp, and outputs the generated time series data to the retrieval processing unit 23.

In addition, the frequent pattern detecting unit 215 generates time series data which is a combination of items not belonging to the frequent pattern and which has, as elements, a set of items that occurs more frequently than in the learning phase, and outputs the generated time series data to the retrieval processing unit 23. Furthermore, in a case where the frequent pattern is expressed by a combination of the antecedent, the consequence, and the confidence that is the probability of occurrence of the consequence when the antecedent is established in the correlation rule, the frequent pattern detecting unit 215 outputs, to the retrieval processing unit 23, time series data having, as an element, the identification value of a frequent pattern in which only the antecedent is present and the consequence is not present.

In a case where the inter/extrapolation processing unit 22 or the retrieval processing unit 23 is not provided, the time series data output from the frequent pattern detecting unit 215 to the inter/extrapolation processing unit 22 or the retrieval processing unit 23 can be presented to the user by being displayed on the display apparatus in a tabular or graphic form as analysis support information of the information system.

FIG. 5 is a flowchart illustrating an operation of the frequent pattern analyzing unit 21 during learning, and illustrates an operation in a learning phase in which the data analysis apparatus 2 learns a frequent pattern corresponding to a phenomenon occurring in the information system to be analyzed.

The character string classifying unit 211 classifies the character string at each time stamp of the time series data received by the input apparatus 3A and having the character strings as elements into a classification class, and the numerical value classifying unit 212 classifies the numerical value at each time stamp of the time series data received by the input apparatus 3B and having the numerical values as elements into a classification class (step ST1a). The character string classifying unit 211 and the numerical value classifying unit 212 operate independently of each other, and one of them may operate earlier than the other or they may operate in parallel.

FIG. 6A is a diagram illustrating an example of time series data having character strings as elements. The character string classifying unit 211 acquires, for example, the time series data illustrated in FIG. 6A. FIG. 6B is a graph illustrating an example of time series data having numerical values as elements. The numerical value classifying unit 212 acquires, for example, the time series data illustrated in FIG. 6B.

FIG. 6C is a diagram illustrating an example of time series data having classification values of the character strings as elements. When classifying the character string at each time stamp of the time series data illustrated in FIG. 6A into classification class, the character string classifying unit 211 outputs the time series data as illustrated in FIG. 6C having the classification values indicating the classification classes as elements. For example, in the time series data illustrated in FIG. 6A, classification values of "received xxx" and "received yyy" that are character strings including the word "received" are "L", and classification values of "sent abc" and "sent abd" that are character strings including the word "sent" are "L5". As illustrated in FIG. 6C, the character string classifying unit 211 generates time series data having classification values of the character strings as elements, and outputs the generated time series data to the series integration unit 213.

FIG. 6D is a diagram illustrating an example of time series data having classification values of the numerical values as elements. When classifying the numerical value at each time stamp of the time series data illustrated in FIG. 6B into classification class, the numerical value classifying unit 212 outputs the time series data as illustrated in FIG. 6D having the classification values indicating the classification classes as elements. For example, in the graph illustrated in FIG. 6B, numerical values in the temporal neighborhood of the time stamp indicating each time are classified and assigned with a classification value "M3" or the like. As illustrated in FIG. 6D, the numerical value classifying unit 212 generates time series data having the classification values of the numerical values as elements, and outputs the generated time series data to the series integration unit 213.

Figures 7, 8, 9:
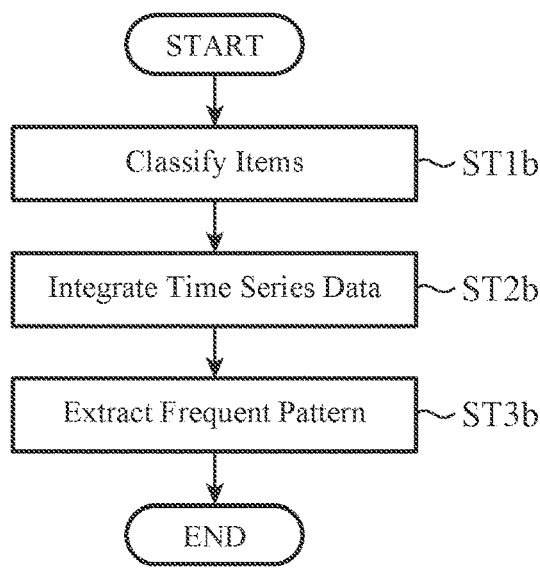
FIG. 7 is a diagram illustrating an overview of processing of extracting a frequent pattern.
FIG. 8 is a flowchart illustrating a data analysis method according to the first embodiment.
FIG. 9 is a diagram illustrating an overview of processing of detecting a frequent pattern.

Next, the series integration unit 213 performs processing of integrating the series data having the classification values of the character strings as elements and the series data having the classification values of the numerical values as elements into one piece of series data (step ST2a). FIG. 7 is a diagram illustrating an overview of processing of extracting a frequent pattern. For example, the series integration unit 213 integrates the time series data illustrated in FIG. 6C having the classification values of the character strings as elements and the time series data illustrated in FIG. 6D having the classification values of the numerical values as elements into one piece of data, and rearranges the order relation according to the time stamps, thereby calculating so-called integrated time series data as illustrated on the left side of FIG. 7.

In the time series data illustrated on the left side of FIG. 7, the classification value of the character string and the classification value of the numerical value are set to the time stamp included in both pieces of time series data before the integration, and the classification value is set to the time stamp not included in one of both pieces of time series data before the integration but included in the other time series data. That is, in the integrated time series data, items are interpolated or extrapolated with each other between both pieces of time series data.

The frequent pattern extracting unit 214 generates transaction data obtained by assigning an identification value of the time stamp to a set of items included in the time series data output from the series integration unit 213, and extracts a frequent pattern by performing frequent pattern mining on the transaction data (step ST3a).

For example, as illustrated on the right side of FIG. 7, items "L3" and "L5" that frequently occur in the time series data illustrated on the left side of FIG. 7 are present in the temporal neighborhood of the time stamp of the item "MO", and thus, the frequent pattern extracting unit 214 extracts the set of these items as a frequent pattern "Pattern 1". The frequent pattern extracting unit 214 extracts a frequent pattern "Pattern 2" which is a set of items "L3" and "L5", and extracts a frequent pattern "Pattern 3" which is a set of items "L1", "M4", "M5", and "M6", in a similar procedure as described above.

The frequent pattern extracting unit 214 may perform machine learning using a neural network or the like for the processing of extracting the frequent pattern. For example, the frequent pattern extracting unit 214 uses a learning model that receives the time series data illustrated on the left side of FIG. 7 as an input and outputs the frequent pattern in the information system to be analyzed. The frequent pattern analyzing unit 21 repeats a sequence of processing illustrated in FIG. 5 in the learning phase. When the processing of FIG. 5 is repeated, the frequent pattern extracting unit 214 learns the frequent pattern in the information system to be analyzed using the time series data acquired from the information system as training data. The definition information of the frequent pattern extracted by the frequent pattern extracting unit 214 is stored in the storage apparatus 4.

The data analysis apparatus 2 performs analysis processing using time series data having numerical values directly representing the state of the device constituting the information system to be analyzed in addition to log data in which the state of the information system is represented in a character string format. As a result, the frequent pattern which is the learning result is refined, and thus, the analysis support information of the information system generated using the frequent pattern and used in the inference phase can be refined.

FIG. 8 is a flowchart illustrating a data analysis method according to the first embodiment, and illustrates details of the process of step ST1 of FIG. 3. A sequence of processing in FIG. 8 is the operation of the frequent pattern analyzing unit 21 in the inference phase. Note that processes in step ST1b and step ST2b in FIG. 8 are the same as those in step ST1a and step ST2a in FIG. 5, so that the description thereof will be omitted.

In the inference phase, the frequent pattern analyzing unit 21 operates alone, or the inter/extrapolation processing unit 22 or the retrieval processing unit 23 operates using the time series data output from the frequent pattern detecting unit 215. Further, in the inference phase, the frequent pattern extracting unit 214 does not operate. The frequent pattern detecting unit 215 detects the occurrence of the frequent pattern in the information system to be analyzed on the basis of whether or not the time series data acquired from the information system to be analyzed matches the frequent pattern obtained in the learning phase.

The frequent pattern detecting unit 215 detects the occurrence of a frequent pattern which is a combination of frequently occurring elements in the time series data output from the series integration unit 213 (step ST3b). For example, the frequent pattern detecting unit 215 generates transaction data using the input time series data, and compares a set of items included in the generated transaction data with the frequent pattern stored in the storage apparatus 4.

FIG. 9 is a diagram illustrating an overview of processing of detecting a frequent pattern. For example, as illustrated on the right side of FIG. 9, a set of items included in the integrated time series data illustrated on the left side of FIG. 9 includes patterns that match "Pattern 1", "Pattern 2", and "Pattern 3" which are frequent patterns stored in the storage apparatus 4. By this matching, the frequent pattern detecting unit 215 detects the occurrence of the frequent pattern in the information system to be analyzed.

When detecting the occurrence of the frequent pattern in the information system to be analyzed, the frequent pattern detecting unit 215 generates time series data having identification values of the frequent patterns generated in the temporal neighborhood of the time stamps, and outputs the generated time series data to the inter/extrapolation processing unit 22. The frequent pattern detecting unit 215 also generates time series data having identification values of the frequent patterns generated in the temporal neighborhood of the time stamps, and outputs the generated time series data to the retrieval processing unit 23.

In addition, when detecting the occurrence of the frequent pattern in the information system to be analyzed, the frequent pattern detecting unit 215 generates time series data which is a combination of items not belonging to the frequent pattern and which has, as elements, a set of items that occur more frequently than in the learning phase, and outputs the generated time series data to the retrieval processing unit 23. Furthermore, in a case where the frequent pattern is expressed by a combination of the antecedent, the consequence, and the confidence that is the probability of occurrence of the consequence when the antecedent is established in the correlation rule, the frequent pattern detecting unit 215 outputs, to the retrieval processing unit 23, time series data having, as an element, the identification value of a frequent pattern in which only the antecedent is present and the consequence is not present.

As described above, after the classification processing is performed for each piece of time series data, the classification values are integrated into one piece of time series data, and frequent pattern mining is performed, so that it is not necessary to match time stamps each having an element between a plurality of pieces of time series data. That is, it is possible to expand the range of use of one piece of time series data used for analysis.

Figure 10:
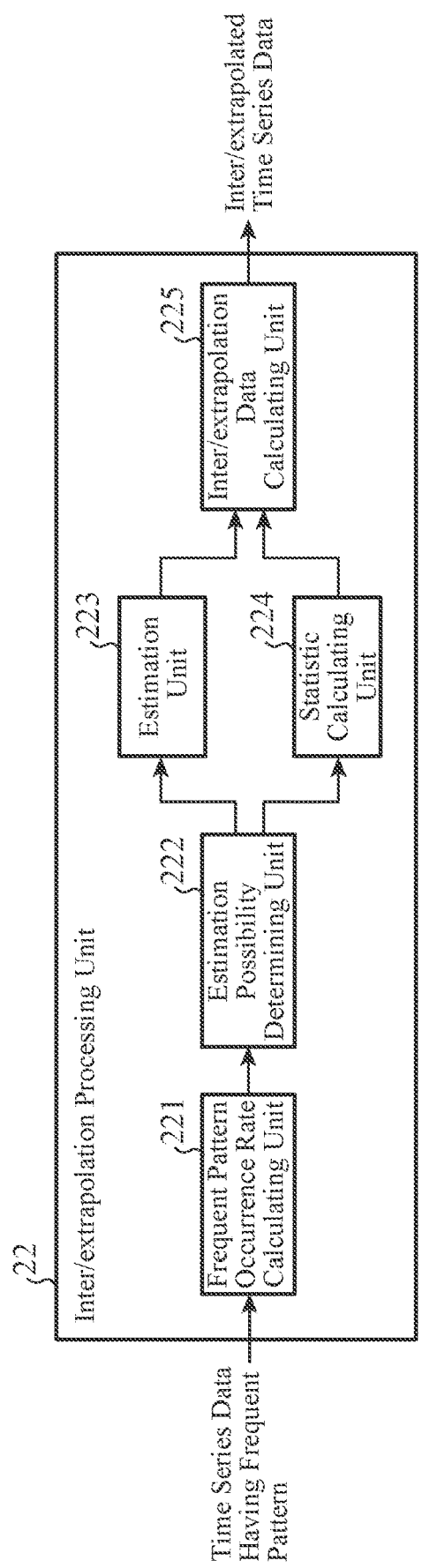
FIG. 10 is a block diagram illustrating the configuration of an inter/extrapolation processing unit.

FIG. 10 is a block diagram illustrating the configuration of the inter/extrapolation processing unit 22. In FIG. 10, the inter/extrapolation processing unit 22 includes a frequent pattern occurrence rate calculating unit 221, an estimation possibility determining unit 222, an estimation unit 223, a statistic calculating unit 224, and an inter/extrapolation data calculating unit 225. The frequent pattern occurrence rate calculating unit 221 acquires series data having the frequent pattern detected by the frequent pattern detecting unit 215 as an element and calculates an occurrence rate of the frequent pattern. For example, the frequent pattern occurrence rate calculating unit 221 calculates a value obtained by dividing the number of times of occurrence of the frequent pattern included in the temporal neighborhood of each time stamp by the total time of the time range defining the temporal neighborhood as the occurrence rate of the frequent pattern. The occurrence rate of the frequent pattern is calculated for each frequent pattern.

The estimation possibility determining unit 222 determines whether or not it is possible to estimate an inter/extrapolation value of an element at a time stamp not included in the series data having occurrence rates of frequent patterns calculated by the frequent pattern occurrence rate calculating unit 221 as elements. For example, the estimation possibility determining unit 222 determines whether or not an inter/extrapolation value of an element at a time stamp not included in the time series data can be estimated for a partial range of elements in the time series data having occurrence rates of frequent patterns as elements, adds a determination value of 0 or 1 indicating a determination result to the partial range, and outputs the partial range.

The estimation possibility determining unit 222 determines whether or not it is possible to estimate an inter/extrapolation value of an element at a time stamp not included in the series data having occurrence rates of frequent patterns calculated by the frequent pattern occurrence rate calculating unit 221 as elements. For example, the estimation possibility determining unit 222 divides the time series data of occurrence rates of frequent patterns into model adjustment data and model verification data, adjusts internal parameters of a time series prediction model by machine learning using the model adjustment data, and measures the accuracy of estimation using the model verification data. Then, the estimation possibility determining unit 222 determines that it is possible to estimate when the estimation accuracy is equal to or greater than an allowable threshold, and determines that it is impossible to estimate when the estimation accuracy is less than the allowable threshold. A determination value of 0 or 1 indicating whether or not estimation is possible is added to the series data having occurrence rates of frequent patterns as elements.

The estimation unit 223 estimates an inter/extrapolation value of the element determined to be estimable by the estimation possibility determining unit 222. For example, the estimation unit 223 estimates an inter/extrapolation value of an element at a time stamp not included in the time series data for a portion added with a determination value (for example, determination value=1) indicating that estimation is possible in the time series data having occurrence rates of frequent patterns as elements. For example, the estimation unit 223 estimates the inter/extrapolation value of the element using the same model as the time series prediction model used by the estimation possibility determining unit 222.

The statistic calculating unit 224 calculates a statistic indicating a statistical distribution of the elements determined not to be estimable by the estimation possibility determining unit 222. For example, the statistic calculating unit 224 calculates the statistic indicating the statistical distribution of the elements present in the portion added with the determination value indicating that the inter/extrapolation value cannot be estimated in the time series data having occurrence rates of frequent patterns as elements. The statistic is, for example, an average value or a variance.

The inter/extrapolation data calculating unit 225 integrates the inter/extrapolation value estimated by the estimation unit 223 and the statistic calculated by the statistic calculating unit 224, and calculates time series data having, as elements, the estimated values of the inter/extrapolation values, a representative value of the estimated values of the inter/extrapolation values, or the range of the estimated values of the inter/extrapolation values in the integrated time series data. For example, the inter/extrapolation data calculating unit 225 integrates the inter/extrapolation value estimated by the estimation unit 223 and the statistic calculated by the statistic calculating unit 224 together for each time series data having occurrence rates of frequent patterns as elements, and calculates time series data having, as elements, the estimated values of the inter/extrapolation values, the representative value of the estimated values of the inter/extrapolation values, and the range of the estimated values of the inter/extrapolation values.

In addition, the inter/extrapolation data calculating unit 225 calculates the representative value or the range of the inter/extrapolation values of numerical values indicating the state of the device constituting the information system to be analyzed on the basis of the inter/extrapolation value estimated by the estimation unit 223, the statistic calculated by the statistic calculating unit 224, and the definition information indicating the classification value indicating the classification class into which the numerical value included in the frequent pattern is classified. For example, the average value, the maximum value, and the minimum value of inter/extrapolation values of numerical values are calculated.

Figure 11:
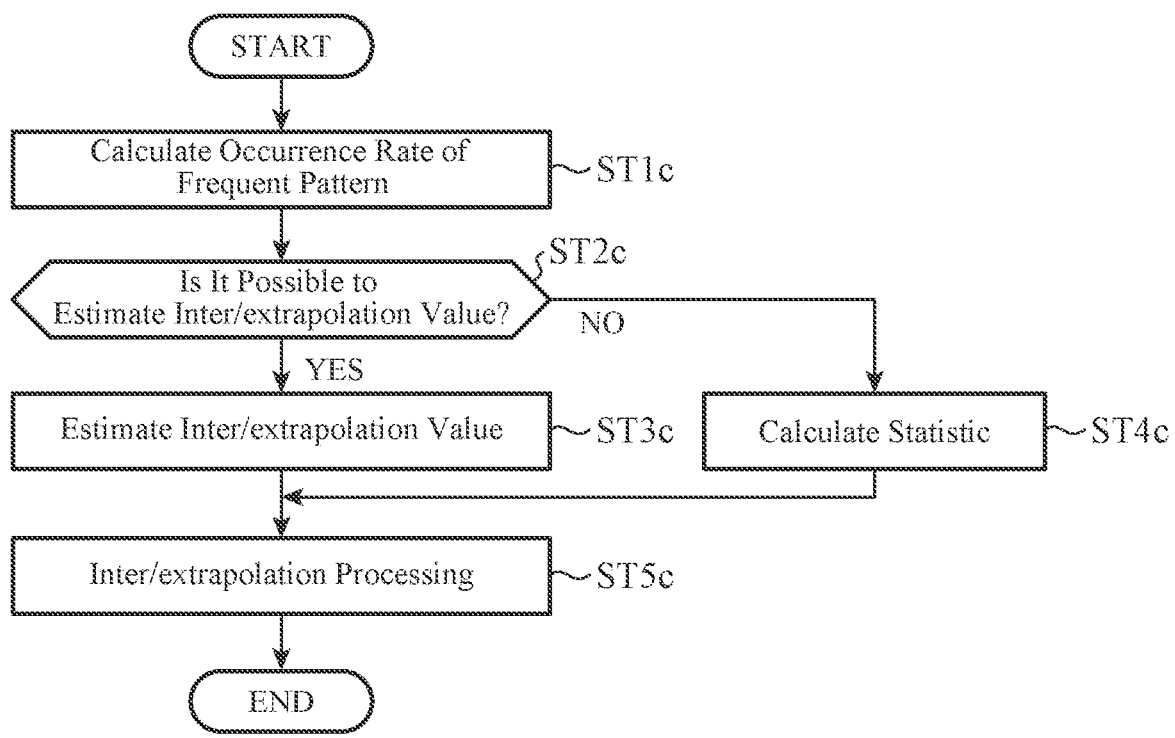
FIG. 11 is a flowchart illustrating processing of interpolating time series data.

FIG. 11 is a flowchart illustrating processing of interpolating or extrapolating time series data, and illustrates details of the process in step ST2 of FIG. 3. The frequent pattern occurrence rate calculating unit 221 acquires time series data having frequent patterns detected by the frequent pattern detecting unit 215 as elements and calculates occurrence rates of the frequent patterns included in the time series data (step ST1*c*). For example, the frequent pattern occurrence rate calculating unit 221 calculates the occurrence rate of each frequent pattern in the temporal neighborhood of each time stamp using the time series data having identification values of the frequent patterns as elements.

Next, the estimation possibility determining unit 222 determines whether or not it is possible to estimate an inter/extrapolation value of an element at a time stamp not included in the time series data having occurrence rates of frequent patterns as elements (step ST2*c*). For example, when determining whether or not it is possible to estimate a inter/extrapolation value of an element at a time stamp not included in the time series data having occurrence rates of frequent patterns as elements, the estimation possibility determining unit 222 adds a determination value of 0 or 1 indicating a determination result to the corresponding portion in the time series data.

When it is determined that the inter/extrapolation value of the element can be estimated (YES in step ST2c), the estimation unit 223 estimates an inter/extrapolation value (step ST3c). For example, the estimation unit 223 estimates an inter/extrapolation value of an element of a portion added with a determination value indicating that estimation is possible in the time series data.

When it is determined that the inter/extrapolation value of the element cannot be estimated (NO in step ST2c), the statistic calculating unit 224 calculates a statistic indicating the statistical distribution of the elements (step ST4c). For example, the statistic calculating unit 224 calculates the statistic indicating the statistical distribution of the elements present in the portion added with the determination value indicating that the inter/extrapolation value cannot be estimated in the time series data having occurrence rates of frequent patterns as elements. The processing performed by the estimation unit 223 and the processing performed by the statistic calculating unit 224 are executed independently of each other, and thus, one of them may be executed earlier than the other or they may be executed in parallel.

The inter/extrapolation data calculating unit 225 calculates time series data having, as elements, the inter/extrapolation value, the representative value of inter/extrapolation values, or the range of the inter/extrapolation value in the time series data obtained by integrating the inter/extrapolation value estimated by the estimation unit 223 and the statistic calculated by the statistic calculating unit 224, and outputs the interpolated or extrapolated time series data (step ST5c). In addition, the inter/extrapolation data calculating unit 225 calculates the representative value or the range of inter/extrapolation values of numerical values indicating the state of the device constituting the information system to be analyzed on the basis of the inter/extrapolation value estimated by the estimation unit 223, the statistic calculated by the statistic calculating unit 224, and the definition information indicating the classification value indicating the classification class into which the numerical value included in the frequent pattern is classified. The inter/extrapolation data calculating unit 225 performs the above processes independently of each other, and thus, the inter/extrapolation data calculating unit 225 may perform one of the processes earlier than the other or may perform both processes in parallel.

FIG. 12A is a diagram illustrating an example of time series data having character strings as elements. FIG. 12B shows graphs illustrating an example of time series data (1) and time series data (2) having numerical values as elements. The frequent pattern analyzing unit 21 acquires, for example, the time series data illustrated in FIGS. 12A and 12B, and outputs time series data having identification values of frequent patterns to the inter/extrapolation processing unit 22.

FIG. 12C shows graphs illustrating an example of interpolated or extrapolated time series data. As illustrated in the upper part of FIG. 12C, the inter/extrapolation data calculating unit 225 calculates an average value A1, a maximum value A2, and a minimum value A3, which are representative values of the estimated values of the inter/extrapolation values of occurrence rates of frequent patterns in the time series data A having occurrence rates of frequent patterns as elements, and calculates time series data having these values as elements.

As illustrated in the middle part of FIG. 12C, the inter/extrapolation data calculating unit 225 calculates an average value (1a), a maximum value (1b), and a minimum value (1c), which are representative values of estimated values of inter/extrapolation values of the elements, in the time series data (1) having numerical values indicating the state of the device constituting the information system to be analyzed as elements, and calculates time series data having these values as elements. As illustrated in the lower part of FIG. 12C, the inter/extrapolation data calculating unit 225 calculates an average value (2a), a maximum value (2b), and a minimum value (2c), which are representative values of estimated values of inter/extrapolation values of the elements, in the time series data (2) having numerical values indicating the state of the device constituting the information system to be analyzed as elements, and calculates time series data having these values as elements.

The frequent pattern detected by the frequent pattern analyzing unit 21 is associated with a phenomenon occurring in the information system to be analyzed. Therefore, it is possible to efficiently analyze a phenomenon that occurs in the information system due to disturbance by analyzing the phenomenon that occurs in the information system while focusing on the frequent pattern. Further, by using the frequent pattern, prediction accuracy of behavior of the information system is improved. For example, there is a case where the estimated value of an inter/extrapolation value of an element at a time stamp not included in time series data corresponds to a predicted element in the future time stamp. In this case, the inter/extrapolation data calculating unit 225 can present an error range of the predicted value of the element by calculating the representative value or range of the estimated value of the inter/extrapolation value.

Figure 13:
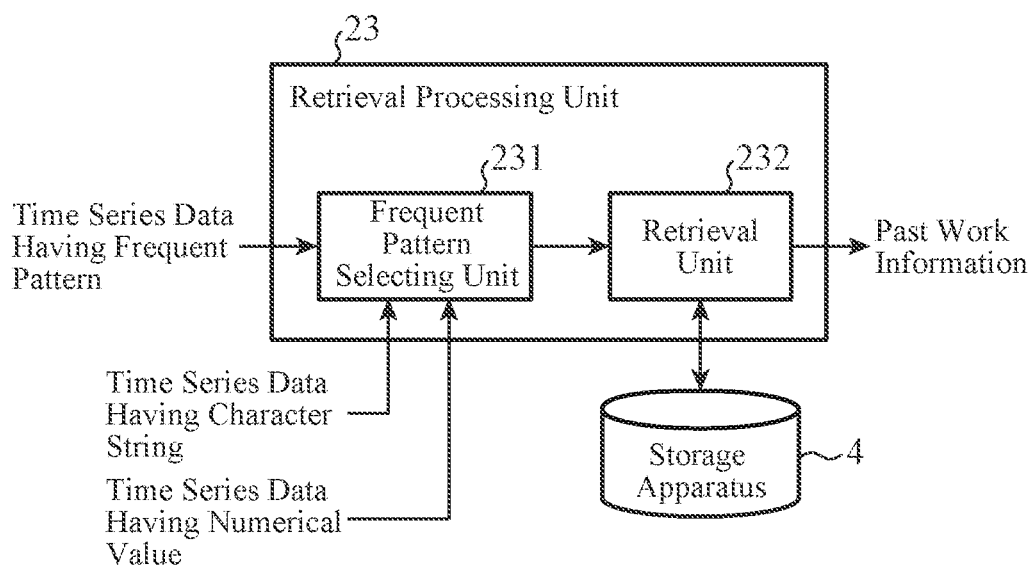
FIG. 13 is a block diagram illustrating the configuration of a retrieval processing unit.

FIG. 13 is a block diagram illustrating the configuration of the retrieval processing unit 23. In FIG. 13, the retrieval processing unit 23 includes a frequent pattern selecting unit 231 and a retrieval unit 232. The frequent pattern selecting unit 231 is a selecting unit that selects time series data according to the degree of importance from at least one of the time series data having frequent patterns detected by the frequent pattern detecting unit 215 as elements, the time series data received by the input apparatus 3A and having character strings as elements, and the time series data received by the input apparatus 3B and having numerical values as elements.

In the time series data having identification values of frequent patterns as elements, for example, an amount of deviation from 1 which is a value of the ratio between the occurrence frequency of the element in the information system to be analyzed and the occurrence frequency of the element in the time series data used in the learning phase of the frequent pattern can be used as the degree of importance. For example, when the ratio between them is 1.2, an amount of deviation from the value 1 is 1.2−1.0=0.2.

In addition, for time series data having a combination of items that cannot be classified into the frequent pattern as elements, the number of occurrences of items that cannot be classified into the frequent pattern can be used as the degree of importance, for example. Furthermore, for time series data having the identification value of a frequent pattern in which only the antecedent is established as an element, the confidence calculated in the learning phase for the corresponding frequent pattern can be used as the degree of importance, for example.

The retrieval unit 232 retrieves the work information corresponding to the time series data selected by the frequent pattern selecting unit 231 among past work information pieces for the phenomenon occurring in the information system to be analyzed, and outputs the retrieved work information. The past work information is information in which determination or the content of work performed by the user in the past for a phenomenon occurring in the information system is registered.

Figure 14:
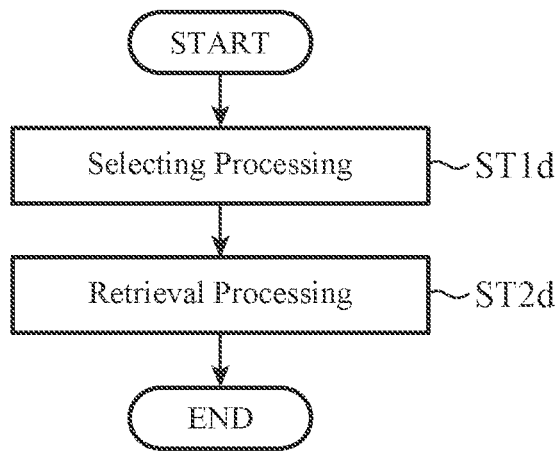
FIG. 14 is a flowchart illustrating processing of retrieving past work information.

FIG. 14 is a flowchart illustrating processing of retrieving past work information, and illustrates the detail of the process in step ST3 of FIG. 3. The frequent pattern selecting unit 231 selects time series data according to the degree of importance from at least one of the time series data having frequent patterns as elements, the time series data having character strings as elements, and the time series data having numerical values as elements (step ST1d). For example, the frequent pattern selecting unit 231 selects a portion to be presented to the user among the time series data having frequent patterns as elements, the time series data having character strings as elements, and the time series data having numerical values as elements, using the degree of importance.

The retrieval unit 232 retrieves the work information corresponding to the time series data selected by the frequent pattern selecting unit 231 among the past work information pieces stored in the storage apparatus 4, and outputs the retrieved work information (step ST2d). For example, the retrieval unit 232 retrieves past work information associated with the frequent pattern stored in the storage apparatus 4 on the basis of the same frequent pattern or combination of items in the list of identification values of the frequent patterns, the list of combinations of items, or the list of identification values of the frequent patterns in which only the antecedent is established, and outputs the retrieved work information.

When the frequent pattern or the combination of items other than the frequent pattern used for the retrieval by the retrieval unit 232 is used as the analysis support information by the user, the retrieval unit 232 generates work information indicating the determination or the content of work performed by the user using the frequent pattern or the combination of items other than the frequent pattern, and stores the generated work information in the storage apparatus 4. The work information stored in the storage apparatus 4 may be created by the user using an input apparatus.

FIG. 15A is a diagram illustrating frequent pattern information stored in the storage apparatus 4. FIG. 15B is a diagram illustrating an example of past work information. For example, the storage apparatus 4 stores, as the frequent pattern information, the frequent pattern and the past work information for the phenomenon corresponding to the frequent pattern as illustrated in FIG. 15A. When the time series data including the frequent patterns "Pattern 1" and "Pattern 3" is selected by the frequent pattern selecting unit 231, the retrieval unit 232 retrieves past work information stored in the storage apparatus 4 on the basis of the frequent patterns "Pattern 1" and "Pattern 3". As a result, work information 232A as illustrated in FIG. 15B is retrieved from the storage apparatus 4 and presented to the user.

The retrieval unit 232 retrieves the work information corresponding to the time series data selected by the frequent pattern selecting unit 231 among the past work information pieces stored in the storage apparatus 4. Thus, when a phenomenon which has been addressed in the past reoccurs, the user can identify and repair a problem area on the basis of the past work information associated with this phenomenon. Therefore, the work time can be shortened, and a variation in accuracy of work for the corresponding phenomenon between persons in charge can be suppressed.

In the above, the time series data using a time stamp as an index has been described, but the data analysis apparatus 2 is not limited thereto, and can also handle series data of character strings and series data of numerical values generally having indices that enable comparison of order relations within series and between series.

For example, the data analysis apparatus 2 uses, as an index, a number defining the order relation of pixel positions in image data, acquires series data having, as an element, a pixel value (numerical value) specified by the number serving as an index, and series data having, as an element, explanatory data (character string) including a character string given to a pixel, and performs the above-mentioned data analysis on the acquired pieces of series data. This data analysis result can be utilized for image analysis or processing of interpolating or extrapolating a defective pixel.

In addition, the data analysis apparatus 2 can perform the above data analysis on series data in which the time stamp corresponding to log data of the information system to be analyzed and a numerical value representing the state of a device constituting the information system is replaced with a symbol, such as an alphabet, having a defined order.

In the data analysis system 1, the data analysis apparatus 2 and the storage apparatus 4 may be connected by a communication network.

In addition, when the data analysis processing performed by the data analysis apparatus 2 is combined with other analysis processing that handles common series data, the descriptiveness of the analysis result is further improved. For example, in a case where there is an abnormality detection device that receives log data in a character string format of the information system, the data analysis apparatus 2 performs the data analysis described above on the same log data as the log data acquired by the abnormality detection device or other log data or numerical data acquired simultaneously. The data analysis result by the data analysis apparatus 2 can be analysis support information for analyzing a factor of a phenomenon for which the abnormality detection apparatus issues a warning. For example, by predicting the occurrence frequency of the phenomenon caused by the factor in the future, it is possible to provide the content of a measure to be considered before the information system has a failure.

In a case where the data analysis apparatus 2 includes only the frequent pattern analyzing unit 21 illustrated in FIG. 4, the functions of the character string classifying unit 211, the numerical value classifying unit 212, the series integration unit 213, the frequent pattern extracting unit 214, and the frequent pattern detecting unit 215 in the data analysis apparatus 2 are implemented by a processing circuit. That is, the data analysis apparatus 2 includes a processing circuit that executes processes from step ST1b to step ST3b in FIG. 8. The processing circuit may be dedicated hardware, or may be a central processing unit (CPU) that executes a program stored in a memory.

FIG. 16A is a block diagram illustrating a hardware configuration for implementing the function of the data analysis apparatus 2. FIG. 16B is a block diagram illustrating a hardware configuration for executing software that implements the function of the data analysis apparatus 2. In FIGS. 16A and 16B, an input interface 100 relays the time series data output from the input apparatus 3A and 3B to the data analysis apparatus 2. An output interface 101 relays, for example, time series data output from the data analysis apparatus 2 to an apparatus including the inter/extrapolation processing unit 22.

When the processing circuit is a processing circuit 102 that is dedicated hardware illustrated in FIG. 16A, the processing circuit 102 is, for example, a single circuit, a composite circuit, a programmed processor, a parallel programmed processor, an application specific integrated circuit (ASIC), a field-programmable gate array (FPGA), or a combination of some of these circuits. The functions of the character string classifying unit 211, the numerical value classifying unit 212, the series integration unit 213, the frequent pattern extracting unit 214, and the frequent pattern detecting unit 215 in the data analysis apparatus 2 may be implemented by different processing circuits, or may be collectively implemented by a single processing circuit.

In a case where the processing circuit is a processor 103 illustrated in FIG. 16B, the functions of the character string classifying unit 211, the numerical value classifying unit 212, the series integration unit 213, the frequent pattern extracting unit 214, and the frequent pattern detecting unit 215 in the data analysis apparatus 2 are implemented by software, firmware, or a combination of software and firmware. Note that software or firmware is described as a program and stored in a memory 104.

The processor 103 reads and executes the program stored in the memory 104, thereby implementing the functions of the character string classifying unit 211, the numerical value classifying unit 212, the series integration unit 213, the frequent pattern extracting unit 214, and the frequent pattern detecting unit 215 in the data analysis apparatus 2. For example, the data analysis apparatus 2 includes the memory 104 for storing programs to eventually execute the processes from step ST1b to step ST3b in the flowchart illustrated in FIG. 8 when the program in the flowchart is executed by the processor 103. These programs cause a computer to execute a procedure or a method of processing performed by the character string classifying unit 211, the numerical value classifying unit 212, the series integration unit 213, the frequent pattern extracting unit 214, and the frequent pattern detecting unit 215. The memory 104 may be a computer-readable storage medium storing a program for causing a computer to function as the character string classifying unit 211, the numerical value classifying unit 212, the series integration unit 213, the frequent pattern extracting unit 214, and the frequent pattern detecting unit 215.

The memory 104 is, for example, a nonvolatile or volatile semiconductor memory such as a random access memory (RAM), a read only memory (ROM), a flash memory, an erasable programmable read only memory (EPROM), or an electrically-EPROM (EEPROM), a magnetic disk, a flexible disk, an optical disk, a compact disk, a mini disk, or a digital versatile disk (DVD).

Some parts of the functions of the character string classifying unit 211, the numerical value classifying unit 212, the series integration unit 213, the frequent pattern extracting unit 214, and the frequent pattern detecting unit 215 included in the data analysis apparatus 2 may be implemented by dedicated hardware, and the other parts thereof may be implemented by software or firmware. For example, the functions of the character string classifying unit 211 and the numerical value classifying unit 212 are implemented by the processing circuit 102 that is dedicated hardware, and the functions of the series integration unit 213, the frequent pattern extracting unit 214, and the frequent pattern detecting unit 215 are implemented by the processor 103 reading and executing the program stored in the memory 104. As described above, the processing circuit can implement the above-mentioned functions by hardware, software, firmware, or a combination thereof.

As described above, the data analysis apparatus 2 according to the first embodiment includes: the character string classifying unit 211 and the numerical value classifying unit 212 that respectively acquire series data having a character string related to the information system to be analyzed as an element and series data having a numerical value indicating the state of a device constituting the information system as an element, classify the element of each of the series data into a classification class, and output series data having a classification value indicating the classification class as an element; the series integration unit 213 that integrates series data having a classification value of the character string as an element and series data having a classification value of the numerical value as an element into one piece of series data; and the frequent pattern detecting unit 215 that detects the occurrence of a frequent pattern, which is a combination of frequently occurring elements, using the one piece of series data obtained through integration by the series integration unit 213.

The series data having the character string related to the information system to be analyzed as an element and the series data having the numerical value indicating the state of the device constituting the information system as an element are integrated into one piece of series data, whereby frequent pattern mining can be performed on the series data in which one of both pieces of series data is interpolated or extrapolated with the other series data. As a result, the data analysis apparatus 2 can supplement data necessary for analysis of a phenomenon that has occurred in the information system to be analyzed.

The data analysis apparatus 2 according to the first embodiment includes the inter/extrapolation processing unit 22 in addition to the frequent pattern analyzing unit 21. The inter/extrapolation processing unit 22 calculates an estimated value of the occurrence rate of the frequent pattern and the statistic of the occurrence rate of the frequent pattern on the basis of the time series data having the frequent pattern detected by the frequent pattern analyzing unit 21 as an element, and interpolates or extrapolates an element at a time stamp not included in the time series data using the estimated value of the occurrence rate of the frequent pattern and the statistic of the occurrence rate of the frequent pattern which have been calculated. The frequent pattern is associated with a phenomenon that has occurred in the information system to be analyzed, and thus, it is possible to efficiently analyze a phenomenon that occurs in the information system due to disturbance by analyzing the phenomenon that occurs in the information system while focusing on the frequent pattern. Further, by using the frequent pattern, prediction accuracy of behavior of the information system is improved.

The data analysis apparatus 2 according to the first embodiment includes the retrieval processing unit 23 in addition to the frequent pattern analyzing unit 21. The retrieval processing unit 23 selects time series data according to the degree of importance from at least one of the time series data having the frequent pattern detected by the frequent pattern analyzing unit 21 as an element, the time series data having a character string as an element, and the time series data having a numerical value as an element, retrieves past work information corresponding to the selected time series data among past work information for the phenomenon that has occurred in the information system to be analyzed, and outputs the retrieved work information.

When a phenomenon which has been addressed in the past reoccurs, the user can identify and repair a problem area on the basis of the past work information associated with this phenomenon. Therefore, the work time can be shortened, and a variation in accuracy of work for the corresponding phenomenon between persons in charge can be suppressed.

It is to be noted that any components in the embodiment can be modified or omitted.

INDUSTRIAL APPLICABILITY

The data analysis apparatus according to the present disclosure can be used, for example, to analyze a phenomenon occurring in an information system.

REFERENCE SIGNS LIST

1: data analysis system, 2: data analysis apparatus, 3A, 3B: input apparatus, 4: storage apparatus, 21: frequent pattern analyzing unit, 22: inter/extrapolation processing unit, 23: retrieval processing unit, 100: input interface, 101: output interface, 102: processing circuit, 103: processor, 104: memory, 211: character string classifying unit, 212: numerical value classifying unit, 213: series integration unit, 214: frequent pattern extracting unit, 215: frequent pattern detecting unit, 221: frequent pattern occurrence rate calculating unit, 222: estimation possibility determining unit, 223: estimation unit, 224: statistic calculating unit, 225: inter/extrapolation data calculating unit, 231: frequent pattern selecting unit, 232: retrieval unit, 232A: work information

The invention claimed is:

1. A data analysis apparatus comprising processing circuitry
to acquire series data having a character string related to an information system to be analyzed as an element and series data having a numerical value indicating a state of a device constituting the information system as an element, each of the series data having the character string and the series data having the numerical value having an index that enables comparison of element order relations within series and between series,
to classify the element of each piece of the series data having the character string and each piece of the series data having the numerical value into one of a plurality of classification classes,
to output each piece of the series data with one of a plurality of classification values indicating one of the plurality of classification classes as an element,
to perform integration of a first portion of the series data having a first classification value of the character string among the plurality of classification values as an element and a second portion of the series data having a second classification value of the numerical value among the plurality of classification values as an element into one piece of series data, and
to perform detection of an occurrence of a frequent pattern which is a combination of frequently occurring elements, using the one piece of series data obtained by the integration.

2. The data analysis apparatus according to claim 1, wherein the processing circuitry generates transaction data in which an identification value of the index is assigned to a set of elements included in the one piece of series data obtained through the integration, and performs extraction of the frequent pattern by performing frequent pattern mining on the transaction data, and
performs detection of the occurrence of the frequent pattern extracted by the extraction.

3. The data analysis apparatus according to claim 2, wherein the processing circuitry performs detection of the occurrence of the frequent pattern on the basis of whether or not there is the set of elements in the transaction data that matches the frequent pattern extracted by the extraction.

4. The data analysis apparatus according to claim 1, wherein the processing circuitry calculates, on a basis of series data having the frequent pattern detected by the detection as an element, an estimated value of an occurrence rate of the frequent pattern and a statistic of the occurrence rate of the frequent pattern, and interpolates or extrapolates an element in the index that is not included in the series data having the character string and the series data having the numerical value using the estimated value of the occurrence rate of the frequent pattern and the statistic of the occurrence rate of the frequent pattern which have been calculated.

5. The data analysis apparatus according to claim 4, wherein the processing circuitry further performs
to acquire the series data having the frequent pattern detected by the detection as an element and perform calculation of an occurrence rate of the frequent pattern,
to determine whether or not it is possible to estimate an inter/extrapolation value of an element in the index that is not included in series data having the occurrence rate of the frequent pattern as an element,
to perform estimation of an inter/extrapolation value of an element, the inter/extrapolation value being determined that it is possible to estimate,
to calculate a statistic indicating a statistical distribution of an element being determined that it is not possible to estimate, and
to perform integration of the inter/extrapolation value and the statistic into one piece of series data and calculate series data having, as an element, an estimated value of the inter/extrapolation value obtained by the estimation, a representative value of the estimated value of the inter/extrapolation value, or a range of the estimated value of the inter/extrapolation value in the one piece of series data obtained by the integration of the inter/extrapolation value and the statistic.

6. The data analysis apparatus according to claim 5, wherein the processing circuitry calculates a representative value or a range of an inter/extrapolation value of the numerical value indicating the state of the device constituting the information system to be analyzed on the basis of the inter/extrapolation value estimated, the statistic calculated, and definition information indicating the classification value indicating the classification class into which the numerical value included in the frequent pattern is classified.

7. The data analysis apparatus according to claim 1, wherein the processing circuitry performs selection of series data according to a degree of importance from at least one of time series data having the frequent pattern detected by the detection as an element, the time series data having a character string as an element, and the time series data having a numerical value as an element, retrieves past work information corresponding to the series data obtained by the selection among past work information for a phenomenon that has occurred in the information system to be analyzed, and outputs the retrieved work information.

8. A data analysis system comprising the data analysis apparatus according to claim 1.

9. A non-transitory computer-readable storage medium storing a program for causing a computer to execute processing comprising:

to acquire series data having a character string related to an information system to be analyzed as an element and series data having a numerical value indicating a state of a device constituting the information system as an element, each of the series data having the character string and the series data having the numerical value having an index that enables comparison of element order relations within series and between series;

to classify the element of each piece of the series data having the character string and each piece of the series data having the numerical value into one of a plurality of classification classes;

to output each piece of the series data with one of a plurality of classification values indicating one of the plurality of classification classes as an element;

to perform integration of a first portion of the series data having a first classification value of the character string among the plurality of classifications as an element and a second portion of the series data having a classification value of the numerical value among the plurality of classifications as an element into one piece of series data; and to perform detection of an occurrence of a frequent pattern which is a combination of frequently occurring elements, using the one piece of series data obtained through integration.

* * * * *